United States Patent [19]

Byrns

[11] Patent Number: 4,615,464

[45] Date of Patent: Oct. 7, 1986

[54] MOLDED CONTAINER CASE WITH HINGE AND METHOD FOR MAKING SAME

[75] Inventor: James E. Byrns, Clinton, Iowa

[73] Assignee: Custom-Pak, Incorporated, Clinton, Iowa

[21] Appl. No.: 741,712

[22] Filed: Jun. 5, 1985

Related U.S. Application Data

[63] Continuation of Ser. No. 563,963, Dec. 21, 1983, abandoned.

[51] Int. Cl.⁴ .................. B65D 6/02; B23P 11/00; B29C 49/00
[52] U.S. Cl. ..................... 220/469; 16/341; 16/342; 29/11; 29/434; 29/522 R; 29/527.1; 220/4 B; 220/324; 220/335; 220/343; 264/516
[58] Field of Search .............. 29/434, 522 R, 557, 29/11; 16/341, 342; 220/4 E, 4 B, 335, 338, 343, 324, 469; 292/302; 264/98

[56] References Cited

U.S. PATENT DOCUMENTS

| Re. 31,086 | 11/1982 | Johnson, Jr. et al. . | |
| 67,747 | 8/1867 | Goodrich | 16/341 |
| 1,503,190 | 7/1924 | Kim | 16/341 |
| 1,807,220 | 5/1931 | Leberman . | |
| 1,818,454 | 8/1931 | Berger . | |
| 1,878,413 | 9/1932 | Leberman . | |
| 2,035,033 | 3/1936 | Wakefield . | |
| 2,482,920 | 9/1949 | Levi | 220/343 X |
| 2,506,789 | 5/1950 | Hyde . | |
| 2,601,101 | 6/1952 | Derham | 16/341 X |
| 2,642,202 | 6/1953 | Cowen | 16/341 |
| 3,025,947 | 3/1962 | Hammer . | |
| 3,327,841 | 6/1967 | Schurman . | |
| 3,339,781 | 9/1967 | Schurman . | |
| 3,346,137 | 10/1967 | Ricci | 220/4 E |
| 3,381,782 | 5/1968 | Ikelheimer . | |
| 3,389,942 | 6/1968 | Jacob . | |
| 3,552,551 | 1/1971 | Goldberg . | |
| 3,680,177 | 8/1972 | Ginsberg . | |
| 3,710,761 | 1/1973 | Gregory | 220/4 E X |
| 3,828,969 | 8/1974 | Schurman . | |
| 3,886,645 | 6/1975 | Schurman | 29/434 |
| 3,902,598 | 9/1975 | Koob . | |
| 3,902,628 | 9/1975 | Schurman . | |
| 4,005,800 | 2/1977 | Schurman | 220/469 X |
| 4,048,051 | 9/1977 | Gretz | 220/324 X |
| 4,153,178 | 5/1979 | Weavers . | |
| 4,164,309 | 8/1979 | Staats . | |
| 4,211,337 | 7/1980 | Weavers et al. . | |
| 4,216,862 | 8/1980 | Daenen . | |
| 4,340,139 | 7/1982 | Wilcox . | |
| 4,343,412 | 8/1982 | Wilcox . | |

FOREIGN PATENT DOCUMENTS 1525348  5/1968  France .................. 220/338

Primary Examiner—Howard N. Goldberg
Assistant Examiner—R. S. Wallace
Attorney, Agent, or Firm—Curtis, Morris & Safford

[57] ABSTRACT

A container case includes a cover, a base and a hinge which pivotally joins the cover and the base on a corresponding side of each. The cover, base and hinge are formed by blow molding. The cover and base are double-walled in construction and identical so that they can be formed from the same mold. Each of the cover and base includes cylindrically-shaped, hollow extensions which form portions of the hinge. When the case is assembled, alternate hinge portions of the cover and base are aligned end-to-end along a common axis and cooperatingly mate to form the full hinge. The hinge is drilled to form openings in the end surfaces of the mating hinge portions which communicate with the interior, hollow areas of the hinge portions to form a single bore through the entire axial length of the hinge. A polyethylene pin is received by the hinge bore to interlock the individual hinge portions. The container case is also provided with a slidable latch having a C-shaped polyethylene bracket which slides on rails or tracks formed on extensions of corresponding sides of the cover and base. The bracket is capable of sliding to overlap mating edge portions of the latch extensions to keep the container case closed.

9 Claims, 7 Drawing Figures

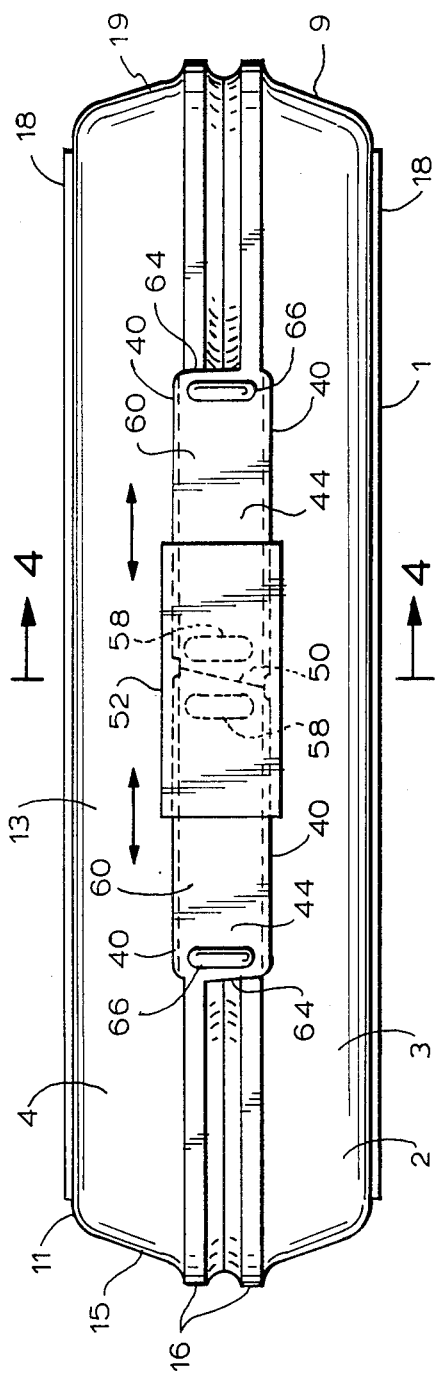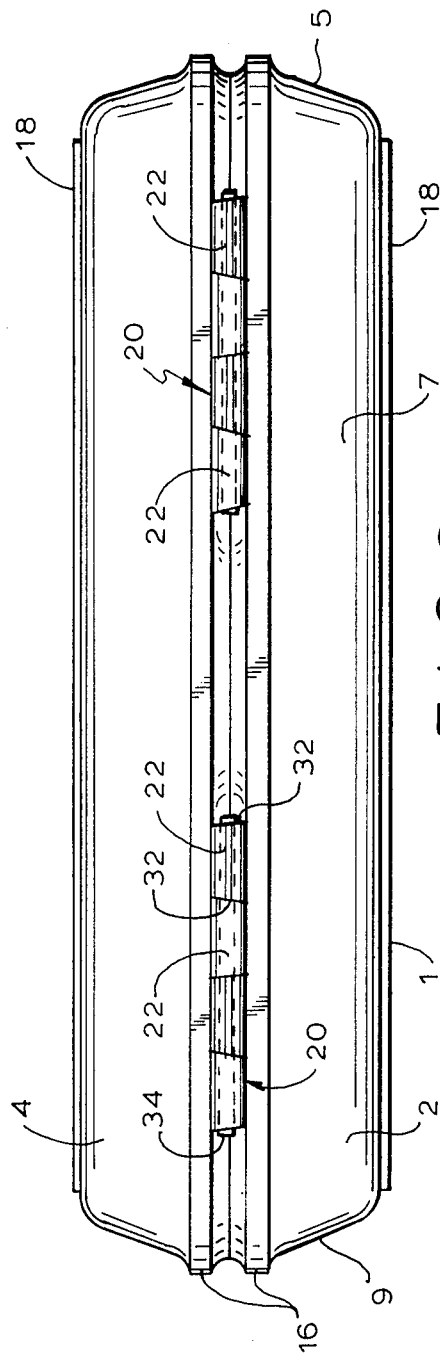

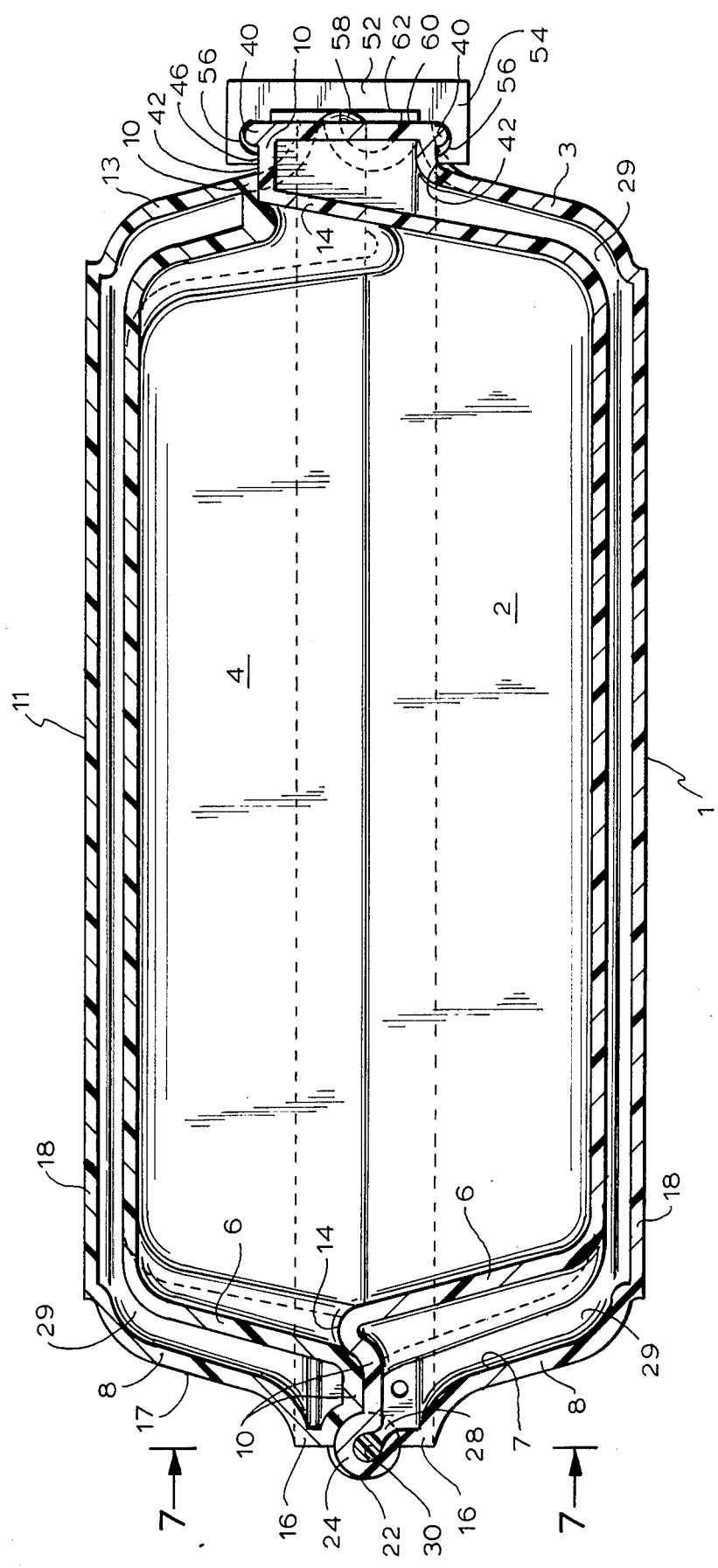

MOLDED CONTAINER CASE WITH HINGE AND METHOD FOR MAKING SAME

This application is a continuation of application Ser. No. 563,963, filed Dec. 21, 1983, now abandoned.

BACKGROUND OF THE INVENTION

Field Of The Invention

The present invention relates to a new and useful container case and more particularly to a container case made from a blow molding process. Even more specifically, the present invention relates to a blow molded container case having a new and improved hinge, also made from a blow molding process, for joining the main body parts of the container case together.

It is well known in the art and advantageous to form separately the main body parts of a container case, usually a base and a cover, and to then assemble these parts together to form the finished product. So that the parts cooperate to allow the case to be opened and closed, a hinge is provided which is preferably simple in construction to allow the manufacturer to quickly and easily assemble the case. In designing container cases, the hinge is usually one of the weakest points on the case and often enough fails prematurely. Therefore, although it is desirable to make the hinge as simple as possible, it should also be strong enough to withstand wear and tear caused by normal use of the case and also abnormal use, for instance, when the container case is forced open wider than it is designed to open. For the purpose of increasing the strength of the hinge, many manufacturers prefer to form the hinge integrally with the body parts of the case.

Since the advent of blow molding, it has become popular in the industry to form container or carrying cases from a thermoplastic material using the process. Advantageously, the hinge can be formed integrally with the body parts of the case from the same parison material forming the body parts. In many instances where the body parts of the case consist of a cover and a base, the cover and base include separate portions which cooperatingly mate to form the hinge when the case is assembled. Whether or not the case parts are injection molded or blow molded or single-walled or double-walled in construction, it is the usual practice to form solid plastic hinge portions by compression molding. During assembly of the case, the hinge portions integrally joined to the cover and base are aligned end-to-end along a common axis, drilled in the axial direction entirely through their combined length and pinned usually with a steel rod to form a typical container case hinge.

There are many inherent disadvantages of the conventional container cases having compression molded hinge portions integrally formed with the case parts. One such disadvantage exhibits itself during assembly. Because the mating hinge portions must be drilled to form a receiving bore for a pin, quite often the drill wanders off center from the common axis during the drilling operation and breaks through the sidewall or corner edge of one of the hinge portions. In that situation the case must be scrapped.

A second disadvantage of the conventional case described above is that it typically uses a steel pin to join the hinge portions together. The steel pin is usually loosely seated in the receiving bore and, if the ends of the pin are not hooked or flared, may work itself free of the bore. This may be caused by either the bore being formed with a diameter greater than that of the steel pin or, through normal flexing of the hinge, the bore's diameter increasing from wear due to the steel pin.

If upon final inspection before shipment, a defect in the case is noticed, the manufacturer will sometimes try to save costs by melting the defective case into a thermoplastic material and reusing the material to form another case. If steel hinge pins are used, they must of course be removed before the case is melted. Additional time is thus required to disassemble the defective case before melting it down into a thermoplastic material for reuse.

The cover and base of the typical container case are usually further provided with a stop or rest in the form of an extension situated near the hinge. The purpose of this stop or rest is to prevent the case from opening too far, that is, to allow the cover to move pivotally relative to the base no more than a predetermined arc. In many instances, the stop may comprise a pair of raised portions of the cover and base which are aligned to contact each other when the case is fully opened. Although the stop is adequate in many applications, there are instances when excessive force applied to open the case is transmitted to the hinge by the leverage of the stop to cause the hinge to rupture.

OBJECTS AND SUMMARY OF THE INVENTION

An object of the present invention is to provide a new and improved container case which can be cost effectively manufactured and readily assembled.

Another object of the present invention is to provide a container case made from a blow molding process which is both lightweight to carry and durable in construction.

A further object of the present invention is to provide a container case, the parts of which including the hinge are made by blow molding.

A still further object of the invention is to disclose a new and improved hinge for a molded container or carrying case which simplifies the assembly of the case.

It is yet a further object of the present invention to provide a hinge for a molded container case which in many applications may obviate the need for a stop or rest to limit how far the case can be opened.

It is an additional object of this invention to describe a new and useful container case with identical body parts so that only a single mold is necessary for its manufacture.

It is yet an additional object of this invention to describe a blow molded container case which is designed to be leak resistant and which is provided with a simple yet effective latch.

The container case of the present invention basically comprises a cover and a base which are pivotally joined on a corresponding side of each by a hinge. The cover, base and hinge are preferably formed by blow molding. The cover and base are double-walled in construction and each includes cylindrically-shaped, hollow extensions of the double walls which form portions of the hinge. The cover and base are preferably identical so that they can be formed from the same mold. When the case is assembled, alternate hinge portions of the cover and base are aligned end-to-end along a common axis and cooperatingly mate to form the full hinge. The hinge is drilled to form openings in the end surfaces of the mating hinge portions which communicate with the interior, hollow areas of the hinge portions formed by blow molding. Thus, a single bore is formed through the entire axial length of the hinge. A polyethylene pin is received by the hinge bore to interlock the individual hinge portions.

The container case according to the present invention is further provided with a slidable latch comprising a C-shaped polyethylene bracket which slides on rails or tracks formed on extensions of corresponding sides of the cover and base. The bracket is capable of sliding to overlap mating edge portions of the latch extensions thereby keeping the container case closed.

The container case may additionally be provided with interior ribs formed as extensions partially encircling the peripheries of the cover and base. The ribs of the cover and base mate when the case is in the closed position to form with the latch extensions a water or dust barrier completely surrounding the interior of the case.

The above and other objects, features and advantages of this invention will be apparent in the following detailed description of an illustrative embodiment thereof, which is to be read in connection with the accompanying drawings.

BRIEF DESCRIPTION OF THE DRAWINGS

FIG. 2 is a front elevation of the container case showing in particular the slidable latch used to keep the container case closed.

FIG. 3 is a rear elevation of the container case showing a pair of hinges formed in accordance with the present invention.

FIG. 4 is a transverse sectional view of the container case taken along lines 4—4 of FIG. 2.

DETAILED DESCRIPTION OF THE PREFERRED EMBODIMENT

Figure 5:
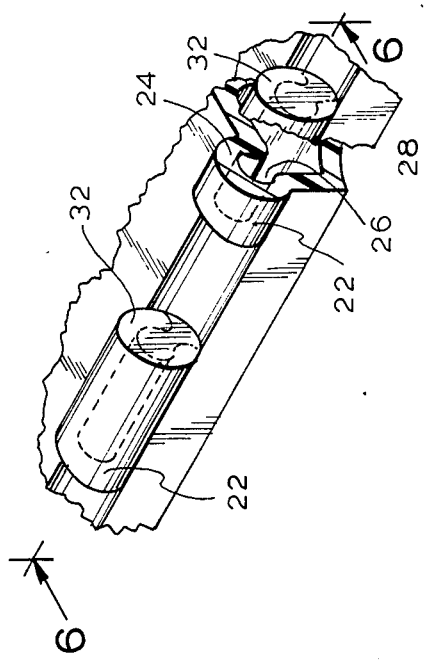
FIG. 5 is a fragmentary perspective view, on an enlarged scale, of hinge portions of a respective case part with one of the hinge portions partially broken away.
Figure 1:
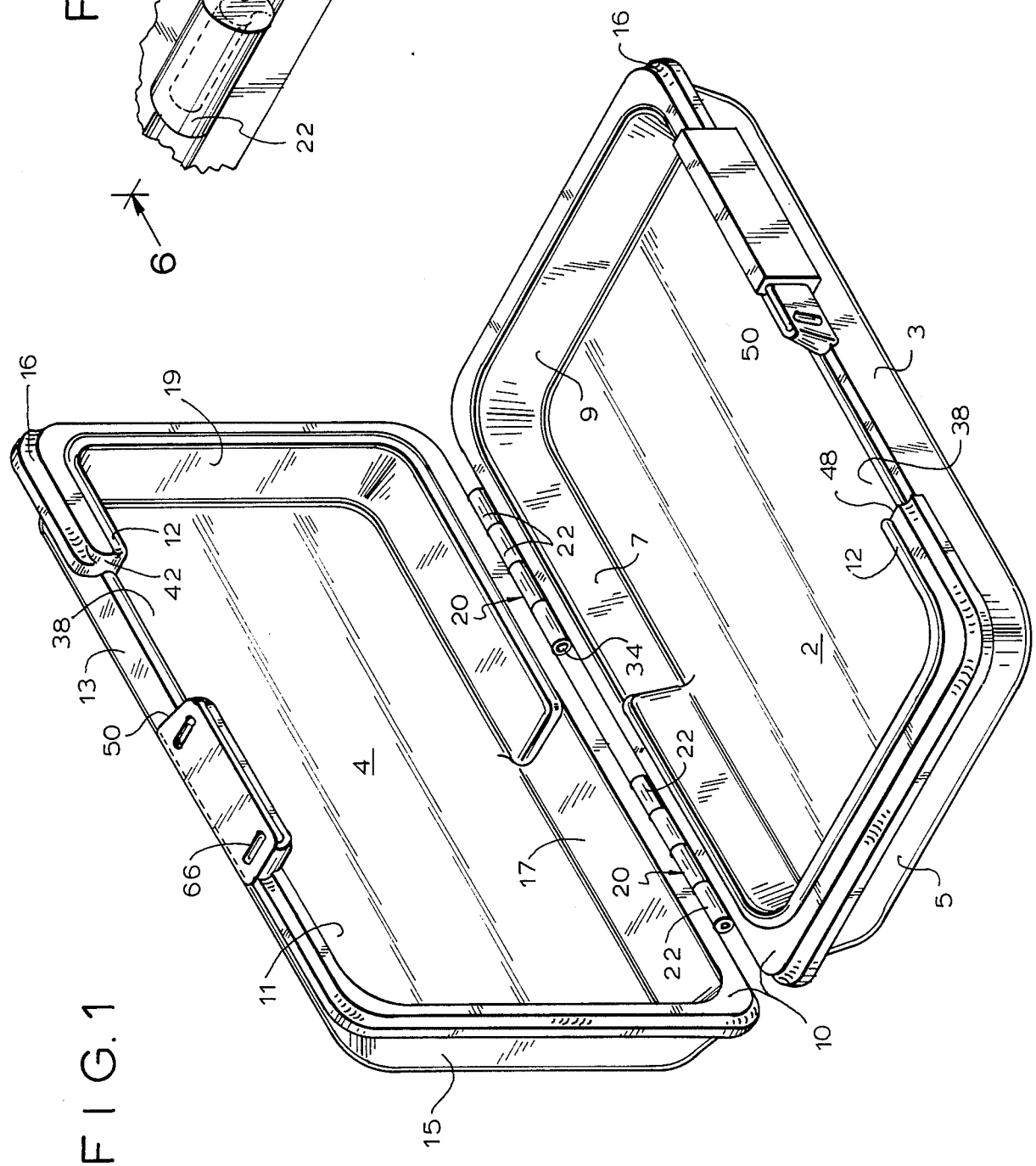
FIG. 1 is a perspective view of a container case constructed in accordance with the present invention.
Figure 6:
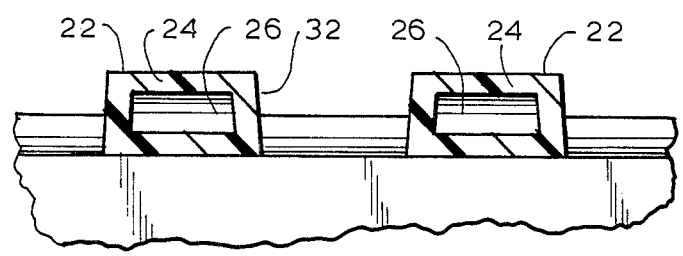
FIG. 6 is a fragmentary sectional view of the container case taken along lines 6—6 of FIG. 5.
Figure 7:
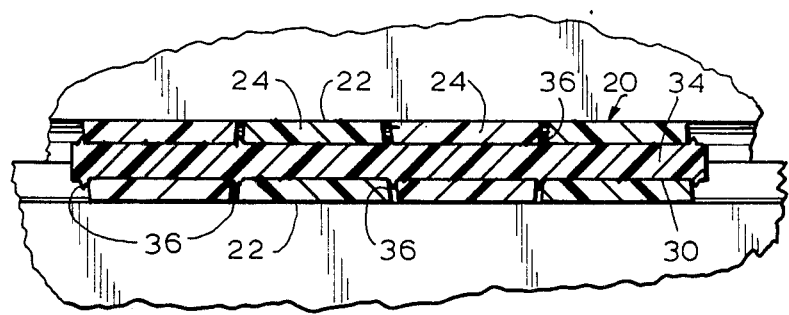
FIG. 7 is a fragmentary sectional view of the container case taken along lines 7—7 of FIG. 4.

Referring now to the drawings in detail and initially to FIGS. 1 through 4 thereof, it will be seen that a container case constructed in accordance with the present invention includes a base 2 and a cover 4 which are preferably identical in construction and design so that they cooperate when assembled to form the container case. The base 2 and cover 4 are preferably formed by blow molding and, because they are made identical, can be formed from the same mold. This, of course, greatly simplifies the manufacture of the case and reduces the production costs.

The base 2 and cover 4 are generally box-shaped. The base includes a planar bottom wall 1 and peripheral sidewalls 3, 5, 7, 9 extending from the bottom wall 1. The cover includes a planar top wall 11 and peripheral sidewalls 13, 15, 17, 19 extending from the top wall 11. The base 2 and the cover 4 are double-walled in construction with inner walls 6 and outer walls 8 on all four sides and on top and bottom. The double-walled construction strengthens the case and cushions its contents. For additional strength the inner and outer walls 6, 8 of the base and cover may be shaped to meet in a flattened peripheral rim 10. The peripheral rims 10 of the base and cover are aligned to meet when the container case is closed.

It may be desirable to extend a portion of the inner walls 6 of the base and cover beyond their respective peripheral rims 10 to form ribs 12. The ribs 12 preferably extend around the periphery of their respective case part about halfway or less so that when the base 2 and cover 4 are assembled, their ribs 12 combine to extend about a major portion of the inner periphery of the case. As shown in Fig. 4, the rib 12 of the cover 4 may abut the inside surface 14 of the inner wall of the base 2 and, likewise, the rib 12 of the base 2 may abut the inside surface 14 of the inner wall of the cover 4.

The ribs 12 provided on the base and cover serve three basic functions. They aid in preventing water or dust from entering the interior of the case. They also help prevent the base and cover from moving laterally with respect to one another. In addition, the ribs help ensure that the base and cover are in alignment when the container case is closed.

The outer walls 8 of the cover 4 and base 2 may be extended to form outwardly flared portions 16 at the rim 10 of each part substantially about the periphery of the part. This flared portion 16 facilitates removal of the part from the mold and also provides the cover and base with a widened rim 10. It additionally provides the container case with an aesthetically pleasing shape.

Each of the cover 4 and base 2 may include a stepped portion 18 which provides the case with a level, flat surface for stability. The surface of the stepped portion 18 or the sidewalls of the cover and base may be textured with a grain or other decorative pattern or may include an embossing of, for instance, the manufacturer's logo.

Referring now to FIGS. 4 through 7 of the drawings, it can be seen that the base 2 and cover 4 are pivotally joined on a corresponding side of each by a hinge designated generally by reference numeral 20. Shown in the drawings are a pair of hinges, but it is, of course, envisioned that a single hinge extending the full or partial length of the case may be employed. The hinge 20 includes a number of portions 22 which are formed integrally with the base 2 and cover 4. As shown in FIGS. 4 and 5, the hinge portions 22 of each of the cover and base are generally cylindrically-shaped and spaced apart from each other a distance of about the length of one hinge portion. As is evident from FIGS. 4 and 5, the hinge portions 22 are preferably formed by blow molding with the body parts of the case. Thus, blow molding leaves a substantially annular formation of plastic material which comprises the cylindrical wall 24 of each hinge portion 22. The cylindrical wall 24 partially encircles a hollow area 26 communicating through a channel 28 with the space 29 defined by the inner and outer walls 6, 8 of a respective main body part. As will be described in greater detail later, the hollow area 26 in the interior of each hinge portion 22 aids to guide a drill bit during assembly of the case.

The hinge portions 22, peripheral rim 10, rib 12, inner wall 6 and outer wall 8 of each body part can thus be formed from a single, continuous layer of thermoplastic material, as can be seen when the case is viewed in section such as in FIG. 4 of the drawings. Thus, the container case and its hinge 20 can be readily manufactured by a blow molding process.

The hinge portions 22 of the cover 4 and base 2 preferably extend at a 45° angle from the outer peripheral edges of their respective body parts. In this way, the hinge portions of the cover can align with those of the base along a common principal axis.

When the container case of the present invention is assembled, the hinge portions 22 of the cover 4 and base 2 are alternatingly fitted together in an end-to-end relationship and, as stated previously, aligned along a common axis to define the hinge 20 of the case. The hinge 20 is then drilled to form a central bore 30 extending the entire length of the hinge. Because the hinge portions 22 are formed by blow molding, leaving a hollow area 26 in the interior of each, only the end surfaces 32 of the hinge portions need be drilled to form the central bore 30 through the length of the hinge. Because of this, very little pressure need be exerted on the drill during the drilling operation.

Furthermore, the hollow hinge portions 22 guide the drill bit and facilitate the formation of the central bore 30. This can be easily seen with reference to FIG. 4. Except for the narrow channel 28 between the interior, hollow area 26 of each hinge portion and the space 29 between the inner and outer walls 6, 8, the cylindrical walls 24 of the hinge portions surround and thus define a major portion of the bore 30. Because the channels 28 of adjacent, mating hinge portions are offset 90° from each other when the case is viewed in section as in FIG. 4, the drill bit is guided by the cylindrical walls 24 of the hinge portions 22 as it passes through one hinge portion to the next during drilling. The drill bit cannot wander off center or deviate from the principal axis of the hinge as it can with conventional cases having solid plastic, injection molded hinges.

After mating hinge portions are aligned and drilled to form a central bore 30, a hinge pin 34 is inserted into the bore to interlock the mating portions 22 of the hinge 20. The hinge pin 34 is preferably made of a material which is as soft as or softer than the parison material used to form the main body parts of the case. By forming the hinge pin 34 from a plastic material, such as polyethylene, the pin will conform more closely to the shape of the bore and may exhibit a greater frictional force on the inside surface of the cylindrical walls 24 of the hinge portions 22 than conventionally used steel rods will. A plastic pin may also exhibit more resiliency than a steel pin, which may bend out of shape.

A further feature of the container case constructed in accordance with the present invention and more particularly the hinge 20 itself is the ability of the hinge to keep the case open in almost any desired position and to resist with increasing force a pressure applied in opening the case wider than what was intended by the manufacturer.

As stated previously, the hinge portions 22 are generally cylindrically-shaped. More preferably, they are slightly tapered with the end surfaces 32 of each being mutually convergent. When shown in section, as in FIG. 6 of the drawings, they are trapezoidally-shaped in geometry. The angle of taper, i.e., the angle the end surface of the hinge portion makes with the vertical, is preferably between 2° and 4°. Stated another way, the end surfaces form interior angles with their respective body parts of between 86° and 88° measured along a normal to the planes in which the top and bottom walls principally reside. It is envisioned that more extreme angles of taper, that is, greater than 4°, will work as well in some applications.

The taper provided the hinge portions 22 serves three primary purposes. As the assembled container case is being opened, the ends of adjacent hinge portions contact each other with increasing pressure, caused by wedging the wider sections of the hinge portions of one body part between the wider sections of the hinge portions of the other body part. This permits the cover 4 to remain open in almost any position, which facilitates access to the interior of the case and its contents. The force developed by the tapered hinge portions 22 increases in magnitude to a point where it may offset a reasonable force applied in opening the case, thereby restricting the pivotal separation of the cover 4 and base 2 beyond a predetermined arc. In many applications using the container case described herein, the hinge 20 with its tapered portions 22 obviates the need for a separate rest or stop, such as those formed on the body parts of many conventional cases.

Providing the hinge portions with a taper is further advantageous in that it aids in preventing the hinge pin 34 from working free of the hinge. This is because the pin is made of a relatively soft, plastic material, such as polyethylene. The wedging or binding action of the hinge portions cause ridges 36 or deformations to develop on the surface of the pin 34 at points where adjacent hinge portions meet. These ridges 36 keep the hinge pin 34 in place within the central bore 30 of the hinge and keep the body parts of the case joined together.

A third advantage of tapering the hinge portions 22 resides in the manufacturing stage. As with any blow molded part, it is preferred that the hinge portions exhibit a slight draft angle to facilitate removal of the part from the mold.

The container case of the present invention further includes means for selectively locking the main body parts, i.e., the cover 4 and the base 2, together. Preferably, corresponding sidewalls 3, 13 of the base and the cover opposite the hinged sidewalls are formed with cutouts 38. A remaining portion of the same sidewall of each part projects outwardly to form extensions 44 which bear top and bottom tracks or rails 40 on the top and bottom edge surfaces 42 of these extensions 44. The rails 40 need only be slightly raised above the edge surfaces 42 of the extensions 44 but are of sufficient height to define with the sidewalls 3, 13 a pair of channels 46. The cutouts 38 and extensions 44 formed on the sidewalls of the base and cover are dimensioned and positioned to cooperate so that the extension of the cover 4 is received by the cutout of the base 2, and vice versa, when the container case is closed so that the extensions 44 are in edgewise alignment. The extensions 44 supplement the ribs 12 formed about a portion of the inner periphery of the case to define a water barrier. They further assist in preventing lateral movement between the base and the cover by abutting against the edges 48 of the flared portions 16 of the outer walls and against each other. Corresponding mating edges 50 of the extensions 44 are diagonally cut to facilitate their cooperation as the container case is closed.

The locking means further includes a C-shaped bracket 52 of preferably plastic material, such as polyethylene. The bracket 52 is dimensioned so that its legs 54 extend over and around the rails 40 of the extensions 44 with the end portions 56 of the legs extending into the channels 46 defined by the rails and the sidewalls 3, 13. The length of the bracket 52 is slightly less than that of each extension 44 so that the bracket can be mounted on either extension and slide on the rails 40 from one extension to the other. The container case can be locked by positioning the bracket 52 to overlap the diagonally cut mating edges 50 of the extensions 44 and can be unlocked by sliding the bracket 52 in either direction until it rests completely on one of the extensions 44.

Each extension 44 may be further provided with a protrusion 58 formed on the outer surface 60 thereof. The protrusions 58 are preferably situated near the mating edges 50 of the extensions and are of sufficient height to contact the inside surface 62 of the bracket 52 and exert a slight pressure thereon. The protrusions 58 keep the bracket 52 at rest and prevent it from inadvertently sliding laterally from one extension to the other unless forced to do so. Of course, it is envisioned that additional protrusions 66 may be formed on the outside surfaces 60 of the extensions 44, such as near the non-mating edges 64 of the extensions, to act as stops to prevent the bracket from sliding off the extensions.

The container case of the present invention is lightweight yet durable to withstand severe treatment. The identical body parts minimize manufacturing costs and simplify the assembly of the case. The hinge 20, preferably formed by blow molding, further facilitates assembly of the case and holds the cover 4 in almost any desired position. The ribs 12 surrounding the inner periphery of case act as a water resistant barrier to protect the contents. The sliding latch is simple to operate and an effective means to keep the container case closed.

If a defect in the case should occur during manufacturing, no disassembly is required to reuse the material. Because the cover, base, hinge and hinge pins are all made of polyethylene, the entire case may be remelted.

Although an illustrative embodiment of the invention has been described herein with reference to the accompanying drawings, it is to be understood that the invention is not limited to that precise embodiment, and that various other changes and modifications may be effected therein by one skilled in the art without departing from the scope or spirit of this invention.

What is claimed is:

1. A method for making a container case including a cover and a base, the cover having a substantially planar top wall and peripheral side walls extending from the top wall, the base having a substantially planar bottom wall and peripheral side walls extending from the bottom wall, each of the top wall, bottom wall, and peripheral side walls having an inner wall and an outer wall, each of the cover and the base having a plurality of separated hinge portions connected between the inner and the outer walls of a peripheral side wall, the inner and outer walls of the cover defining a first hollow space, the inner and outer walls of the base defining a second hollow space, comprising the steps of:
   blow molding the cover from a thermoplastic material to form the top and side walls and hollow hinge portions with end surfaces so that the interiors of the hollow hinge portions communicate with the first hollow space;
   blowing molding the base from the thermoplastic material to form the bottom and side walls and hollow hinge portions with end surfaces so that the interiors of the hollow hinge portions communicate with the second hollow space;
   fitting the hinge portions of the cover and the hinge portions of the base together in an end-to-end arrangement along a common axis;
   drilling opening in the end surfaces of the hinge portions to define a central bore; and
   inserting a hinge pin into the central bore.

2. A method as recited in claim 1, wherein the inserting step includes inserting a hinge pin that is at least as soft as the thermoplastic material.

3. A method as recited in claim 1, wherein the step of blow molding the cover includes forming a first interior rib that extends above the inner wall of the cover, the first interior rib partially encircling the inner periphery of the cover, and wherein the step of blow molding the base includes forming a second interior rib that extends above the inner wall of the base, the second interior rib partially encircling the inner periphery of the base.

4. A method as recited in claim 1, wherein the step of blow molding the cover and the step of blow molding the base are performed using an identical mold.

5. A method as recited in claim 1, wherein the drilling step is performed after the fitting step.

6. A method as recited in claim 1, wherein the step of blow molding the cover includes blow molding hollow hinge portions that extend at an angle of approximately 45° from the associated side wall, and wherein the step of blow molding the base includes blow molding hollow hinge portions that extend at an angle of approximately 45° from the associated side wall.

7. A method as recited in claim 1, wherein the step of blow molding the cover includes blow molding hollow hinge portions with end surfaces that are tapered, and wherein the step of blow molding the base includes blow molding hollow hinge portions with end surfaces that are tapered.

8. A method as recited in claim 7, wherein each blow molding step includes blow molding hollow hinge portions with end surfaces that are tapered, the angle of taper being between about 2° and about 4°.

9. A container case including a cover and a base, the cover having a substantially planar top wall and peripheral side walls extending from the top wall, the base having a substantially planar bottom wall and peripheral side walls extending from the bottom wall, each of the top wall, bottom wall, and peripheral side walls having an inner wall and an outer wall, each of the cover and the base having a plurality of separated hinge portions connected between the inner and the outer walls of a peripheral side wall, the inner and outer walls of the cover defining a first hollow space, the inner and outer walls of the base defining a second hollow space, made by a process comprising the steps of:
   blow molding the cover from a thermoplastic material to form the top and side walls and hollow hinge portions with end surfaces so that the interiors of the hollow hinge portions communicate with the first hollow space;
   blow molding the base from the thermoplastic material to form the bottom and side walls and hollow hinge portions with end surfaces so that the interiors of the hollow hinge portions communicate with the second hollow space;
   fitting the hinge portions of the cover and the hinge portions of the base together in an end-to-end arrangement along a common axis;
   drilling openings in the end surfaces of the hinge portions to define a central bore; and
   inserting a hinge pin into the central bore.

* * * * *